United States Patent [19]
Anderson et al.

[11] 3,808,027
[45] Apr. 30, 1974

[54] SILICA SURFACED FILMS

[75] Inventors: Jerrel C. Anderson; Carl J. Heffelfinger, both of Circleville, Ohio

[73] Assignee: E. I. du Pont de Nemours and Company, Wilmington, Del.

[22] Filed: Mar. 29, 1972

[21] Appl. No.: 239,321

[52] U.S. Cl... 117/47 A, 117/138.8 F, 117/138.8 R, 117/169 A
[51] Int. Cl............ B44d 1/094, B44d 5/02
[58] Field of Search............ 117/33, 47 A, 138.8 R, 117/138.8 F, 169 A

[56] References Cited
UNITED STATES PATENTS

| | | | |
|---|---|---|---|
| 2,801,938 | 8/1957 | Iler | 117/169 A |
| 3,649,348 | 3/1972 | Vossos | 117/169 A |
| 3,396,046 | 8/1968 | Landau et al. | 117/47 A |
| 3,497,406 | 2/1970 | Skoog | 117/47 A |
| 2,771,378 | 11/1956 | Motter | 117/47 A |
| 2,786,778 | 3/1957 | Palmquist | 117/12 |
| 3,306,768 | 2/1967 | Peterson | 117/106 |
| 3,392,705 | 7/1968 | McBride | 117/47 A |

FOREIGN PATENTS OR APPLICATIONS

| | | | |
|---|---|---|---|
| 744,670 | 10/1966 | Canada | 117/47 A |

*Primary Examiner*—William D. Martin
*Assistant Examiner*—William R. Trenor

[57] ABSTRACT

A polymeric shaped article having a polar surface with a multiplicity of discrete nodules of amorphous $SiO_2$ bonded to the surface.

9 Claims, 2 Drawing Figures

SILICA SURFACED FILMS

BACKGROUND OF THE INVENTION

In the fabrication of films and fibers from various polymeric materials, it is often necessary to modify the surface characteristics to improve the handling characteristics of the product. For example, in the winding of polymeric films, it is necessary to have certain surface slip characteristics to permit adjustment of consecutive layers on a wound roll of film. Previously, the surface characteristics of films and fibers have been modified by various techniques. Filler materials have been used for both films and fibers to produce asperities on the surface of the product. In addition, product surfaces have been modified by embossing, coating or sizing.

Silicon dioxide is among those materials previously used for coating film surfaces to modify the slip characteristics. However, the application of a continuous film of $SiO_2$ onto a polyester film, for example, often results in a change in appearance of the substrate, and the coating tends to craze on flexing. Other attempts to coat a film or fiber surface have included the application of preformed silicas by vacuum deposition or from solutions or dispersions. However, such coatings often exhibit unsatisfactorily low bond strengths to the substrates.

SUMMARY OF THE INVENTION

The present invention provides polymeric products having improved slip characteristics in combination with excellent optical properties.

Specifically, the instant invention provides a polymeric shaped article having bonded to at least one polar surface thereof a multiplicity of segregated nodules of silicon dioxide.

The invention further provides a process for treating polymeric shaped articles comprising first applying water to a polar surface of the shaped article by bringing the surface into contact with water vapor and thereafter bringing the surface into contact with a hydrolyzable tetrafunctional silicon compound selected from silicon tetrachloride, tetramethylortho silicate, tetraethylortho silicate and mixtures thereof, for a time sufficient to form discrete nodules of silicon dioxide on the surface of the shaped article.

BRIEF DESCRIPTION OF THE DRAWINGS

The figures are photomicrographs of polymeric films of the instant invention.

DETAILED DESCRIPTION OF THE INVENTION

Figure 1:
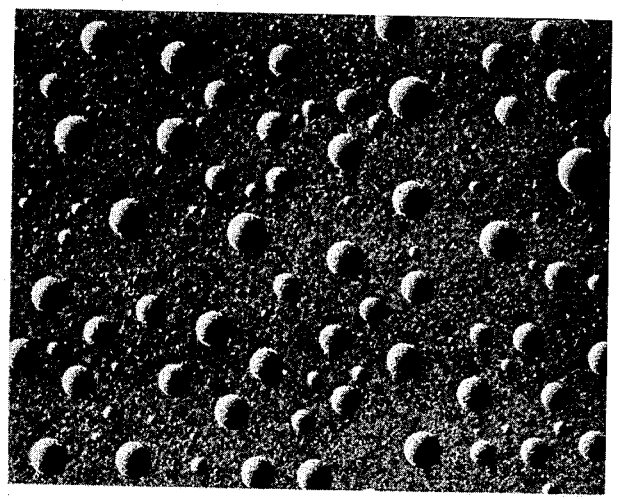

The present invention is applicable to shaped articles, such as films and fibers, of polymers having at least one polar surface. Such polymers include, for example, polyesters such as polyethylene terephthalate, polyimides and nylon, as well as normally nonpolar polymers such as polyolefins, e.g., polyethylenes and polypropylenes, which are treated to increase surface polarity, as by electrical discharge.

The surface of shaped articles of the instant invention is characterized by a multiplicity of nodules of silicon dioxide bonded thereto. The nodules preferably consist essentially of amorphous silica. The character of the nodules is illustrated in the figure, which is a photomicrograph of a polyethylene terephthalate film prepared in accordance with the instant invention, the photograph being taken at a magnification of 27,000X. The nodules are generally circular in configuration, substantially all of the nodules being surrounded by an area of nodular-free film surface. The nodular-free surfaces are substantially free from silica.

The size of the individual nodules varies over a wide range, the diameter generally being about from 100 to 5,000 angstroms and the thickness generally being about from 100 to 1,000 angstroms. The shape of the nodules generally approximates a surface segment of a sphere. The diameter of the nodules can be readily determined by measurement of the photomicrograph and extrapolation to the original size based on the degree of magnification used in the photomicrograph. The thickness can be measured by metallizing the film surface at a known low angle thereby replicating the surface and then viewing the replica with an electron microscope. Measurements of the "shadow" cast by the nodule in the metallizing stream are used to calculate the height of the nodule by standard trigonometric techniques.

The population density of the nodules on the surface of the film can be approximated by using conventional X-ray fluorescence techniques. In a preferred method, the silica concentration is measured as an average layer thickness by first measuring the amount of X-ray fluorescence of the product surface due to silicon. This measurement is used to calculate the amount of silica ($SiO_2$) on the surface, as if the silica were distributed on the surface as a continuous, uniform layer and not as discrete nodules. It has been found that the most desirable product characteristics of the instant invention are obtained when the distributed silica thickness so calculated is about from 5 to 70 angstroms.

The nodules are bonded to the surface of the polymeric shaped article. While the exact nature of the bond is not fully understood, it is believed to arise from silicon-oxygen covalent bonds and secondary hydrogen bonds to functional groups on the substrate. The strength of the bond in the nodules is illustrated by their performance on stretching of a polymeric film. If, after application of the present silicon dioxide nodules, a polymeric film is stretched for orientation according to conventional techniques, the bond between the film and the silicon dioxide nodules is such that the substrate area beneath the nodules does not deform to the same extent as the surrounding polymer. This results in strain deformation radiating from the edges of the nodules. Similarly, testing of the coating surface by the "Scotch tape test," confirms the excellent bond strength of the nodules to the polymer surface. The "Scotch tape test" is conducted by firmly applying, to the surface to be tested, a piece of "Scotch" brand silica-free, pressure-sensitive tape and then stripping away the tape with a quick pull. The amount of coating removed is indicative of the bond strength of the coating. Photomicrographs as well as X-ray fluorescence confirm that typically less than 10 percent of the silicon dioxide is removed from the surface of such a test.

The polymeric shaped articles can be prepared, according to the present invention, by first exposing the article to water vapor to apply moisture to the polymer surface. In general, the speed of the nodule formation, nodule size and population density will increase with greater quantities of water on the surface of the film. Since the size of the nodules increases with the quantity of water available for nodule formation, the quantity of water on the surface of the film should be kept below that which would allow formation of nodules large enough to depreciate the optical characteristics of the product. The moisture can be added to the film by allowing a polymeric product to equilibrate at ambient humidity or preferably by passing the film through a gaseous atmosphere having a high water vapor content, the film being maintained at a temperature below the dew point of the gaseous atmosphere to permit condensation of the water vapor onto the surface of the film as microdroplets. For polyethylene terephthalate, a film temperature of about from 20° to 50° C. has been found particularly effective with gaseous atmospheres maintained at a temperature of about 60° C. containing 150–700 grains of water per pound of dry air.

The film, after exposure to water vapor, is then exposed to at least one gaseous tetrafunctional silicon compound. Tetrafunctional silicon compounds which can be used in the present invention include those which can be hydrolyzed with water to form $SiO_2$ and whose reaction products are volatile and can be readily removed from the coated polymeric substrate. Accordingly, particularly representative tetrafunctional silicon compounds include silicon tetrachloride, tetramethylortho silicate, tetraethylortho silicate and mixtures thereof. These products are readily hydrolyzable and the hydrolysis reaction products, that is, hydrogen chloride, methanol and ethanol, are volatile and easily removed from the forming nodules.

The tetrafunctional silicon compound can be vaporized and applied directly onto the film surface. In addition, it can be applied directly as a liquid or from a solution in an inert solvent such as a liquid halocarbon.

It has been found particularly convenient to have the gaseous tetrafunctional silicon compound transported to the film surface in a carrier, such as a warm, dry air stream. Typical conditions that can be used for applying the silicon tetrachloride for example, using substantially moisture-free compressed air as a carrier, include an air temperature of about from 55° to 60° C. The concentration of the tetrafunctional silicon can vary widely, the rate of nodule formation increasing with concentration. Concentrations of at least about $5 \times 10^{-4}$ moles of silicon tetrachloride per liter of dry air have been found satisfactory. The concentration can be measured by determining the optical density with a monochrometer at a wavelength of 13.16 microns.

As will be evident to those skilled in the art, when higher boiling tetrafunctional silicon compounds are used, such as tetramethylortho silicate and tetraethylortho silicate, the temperature of the carrier gas should be adjusted to a level sufficient to develop an appreciable vapor pressure of the reactant used. With the preferred conditions indicated, exposure to the silicon compound for as short as 0.1 second will provide nodules of the preferred size and population density.

The surfaces of the present polymeric products can be modified using conventional surface treating techniques. For example, flame or electrical discharge treatment of a polymeric film prior to the application of the silica nodules further increases the bond strength of the nodules, and often results in the formation of somewhat flatter nodules as well as the formation of a multiplicity of small nodules on the film surface between the larger nodules of silicon dioxide. Electrical discharge treatment after applying the nodular surface renders a film exceptionally adherent to coatings subsequently applied, for example, for heat sealability, without depreciating the handling characteristics of the film.

Polymeric shaped objects of the instant invention exhibit remarkably improved surface slip characteristics. For example, polyethylene terephthalate films usually exhibit a smooth, tacky surface that interferes with the formation of uniform rolls. However, with a nodular surface of silicon dioxide of the instant invention, good roll package formation can be attained without resort to surface roughening techniques or particulate fillers in the polymer. In addition, the nodular films of the instant invention exhibit optical characteristics substantially the same as the untreated substrate. Polyethylene terephthalate films having a continuous silicon dioxide coating, by contrast, have a lowered surface gloss and exhibit a colored reflection.

The products of the invention, in the form of polymeric filaments, exhibit increased resistance to soiling. In addition, the silicon dioxide coating is compatible with most polymer systems and forms an inert, nontoxic, stable coating that has little or no effect on subsequent surface coatings or treatments of films or fibers. For example, polyester films of the invention can be coated with heat sealable polymeric coatings and are printable on conventional offset color presses. The excellent bond strength of the present products assures that the coating will remain substantially intact through subsequent handlings and use, permitting coated films of the invention to be used, for example, in food packaging applications. Further, the excellent bond strength of the silicon dioxide nodules permits the application of the nodules at any point in the preparation of films or fibers. For example, the nodules can be applied to an amorphous polymeric film immediately after casting, and the nodules will remain intact after biaxial stretching of the film for orientation. In this application, of course, the population density of the nodules will be decreased to the extent that the film surface between nodules is stretched.

The silicon dioxide nodules applied in accordance with the instant invention, possibly due to the discontinuous nature of the coating, effect no appreciable change in the haze, clarity or color of a film surface to which they are applied. Further, the adhesion of a film surface for subsequent lamination is not noticeably depreciated.

The shaped articles of the invention are useful in applications regularly using films and fibers. Polyethylene terephthalate films of the invention, for example, are particularly useful as magnetic tape or photographic bases, or for dielectric substrates for metal coatings.

The invention is further illustrated by the following specific examples.

EXAMPLE 1

A substantially amorphous, unoriented polyethylene terephthalate film having a nominal thickness of 6 mils is maintained at a temperature of about 23° C. and exposed to moist air at about 50° C. for 0.2 second. Immediately thereafter, the humidified film is exposed to an atmosphere of dry compressed air containing $7.5 \times 10^{-4}$ moles per liter of $SiCl_4$ and maintained at a temperature of 50° C., for a period of about 0.2 second. The film, on microscopic examination, is found to have a multiplicity of discrete nodules of silicon dioxide bonded to the surface. The nodules appear to be shaped like spherical segments and range in diameter from 100–4,200 angstrom units. The average distributed thickness of the silicon dioxide is 36 angstrom units. On testing with the Scotch tape test, it is found that less than about 10 percent of the nodules are removed.

The film is found to exhibit excellent roll formation when compared to a control sample of the same film having no silicon dioxide nodules and poor roll formation.

The treated amorphous film was subsequently stretched 3.2X MD by 3.2X TD in each of two mutually perpendicular directions and heat set at a temperature of about 200° C. in a continuous process. A 128-pound roll of 0.5 mil film was produced, the roll having a width of 52 inches. This roll was compared with a control sample having no silicon dioxide. The film of the present invention exhibited markedly superior winding characteristics, forming smooth, well-aligned rolls. Further results are summarized in Table I. An electron photomicrograph of the nodular film surface was taken and appears as FIG. 1.

TABLE I

| Ref. | Control | Example 1 |
|---|---|---|
| $SiO_2$ Distributed Thickness (A) | 0 | 3–4 |
| Coefficient of Static Friction | >1.0 | 0.44 |
| Percent Clarity | 84 | 84 |
| Percent Haze | 0.8 | 0.7 |
| Percent Light Transmission | 89.4 | 89.5 |
| Color | | no change |

EXAMPLE 2

Figure 2:
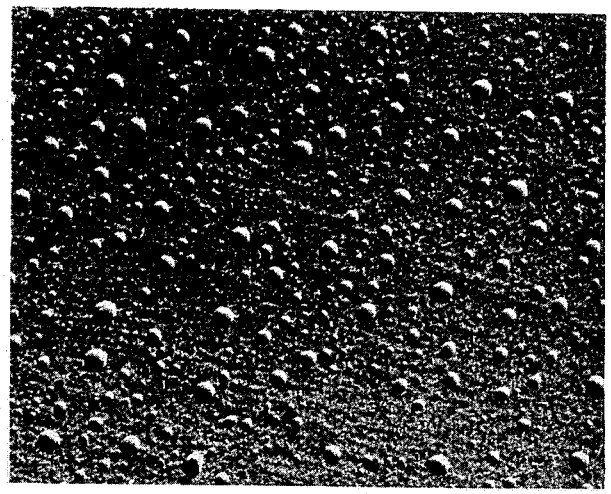

The general treatment of Example 1 is repeated, except that the film is biaxially oriented and heat set before treatment to apply the silicon dioxide nodules. The product characteristics are evaluated by various testing procedures and compared with a silica-free control sample. The results are shown in Table II. A photomicrograph of the surface is taken at a magnification of 27,000X and appears as FIG. 2.

TABLE II

| | Control | Example 2 |
|---|---|---|
| Thickness $SiO_2$ A | 0 | 17 |
| Coefficient of Friction | >1.0 | 0.6 |
| Percent Clarity | 84.4 | 84.8 |
| Percent Haze | 1.3 | 1.3 |
| Color | | no change |
| Gloss 20° | 207 | 199 |
| Contact Angle Water Degrees | 77 | 72 |
| Roll Formation | Poor | Excellent |

EXAMPLE 3

The general procedure of Example 2 was repeated, except that tetraethylortho silicate is used instead of the silicon tetrachloride, and the temperature of the compressed gas carrying the reactant silicate is increased to about 110° C. A similar film surface as well as optical and handling characteristics were obtained.

EXAMPLE 4

The general procedure of Example 2 was repeated, except that "Kapton" polyimide film was used as the base film instead of the oriented, heat-set, polyethylene terephthalate. The winding performance was improved substantially and the static coefficient of friction of this film was reduced from >1.0 to 0.4.

EXAMPLE 5

The general procedure of Example 2 was repeated, except that oriented, heat set linear polypropylene film was used instead of the polyethylene terephthalate film of Example 2 and the polypropylene film was treated with chlorine gas in an electrical discharge to increase surface polarity. The film was then exposed to a humid atmosphere and to $SiCl_4$ vapors to produce a surface characterized by nodules of silicon dioxide. The presence of the silicon dioxide nodules was found to decrease the coefficient of friction on the surface from 0.82 on the treated starting material to 0.26 when the average silica thickness was about 300 angstrom units.

EXAMPLES 6–8

In Examples 6–8, fabrics prepared from fibers of polyethylene terephthalate, nylon 66, and a nylon copolymer were treated according to the general procedure of Example 1. After treatment, the individual fibers of the fabrics were characterized by a multiplicity of silicon dioxide nodules.

The silica treatment did not change the material esthetics of the fabrics in any apparent respects. The fabrics, after treatment, were subjected to soil removal tests, and the fabrics prepared according to the instant invention exhibited anti-soiling improvements of 30 to 40 percent over untreated fabrics.

We claim:

1. A polymeric shaped article having bonded to at least one polar surface thereof a multiplicity of segregated, substantially circular nodules of silicon dioxide formed thereon and having a diameter of about 100 to 5,000 angstroms and a thickness of about 100 to 1,000 angstroms wherein the population density of the nodules is such that the quantity of silicon dioxide is equivalent to a uniformly distributed thickness of about 5 to 70 angstroms, which nodules are formed on said surface by forming microdroplets of water on said surface by bringing said surface into contact with water vapor, and contacting a readily hydrolyzable, tetrafunctional silicon compound with said microdroplets of water on said surface for a time sufficient to form said discrete nodules.

2. A polymeric film of claim 1 wherein said article is a biaxially oriented polyethylene terephthalate film wherein said nodules are formed on said surface before orientation.

3. The coated article of claim 1, wherein said polymeric shaped article is a polymeric film.

4. The coated article of claim 1, wherein said polymeric shaped article is a polymeric fiber.

5. The coated article of claim 3, wherein the polymeric film consists essentially of polyethylene terephthalate.

6. The coated article of claim 3, wherein the said film is biaxially oriented and heat-set.

7. A process for treating polymeric shaped articles comprising forming microdroplets of water on a polar surface of said shaped article by bringing said surface into contact with water vapor, and contacting a readily hydrolyzable, tetrafunctional silicon compound with said microdroplets of water on said surface for a time sufficient to form discrete nodules of silicon dioxide on said surface.

8. A process of claim 7 wherein said silicon compound is selected from silicon tetrachloride, tetramethylortho silicate, tetraethylortho silicate and mixtures thereof.

9. A process of claim 7 wherein said article consists essentially of polyethylene terephthalate.

* * * * *